(12) United States Patent
Lee et al.

(10) Patent No.: US 12,546,870 B2
(45) Date of Patent: Feb. 10, 2026

(54) APPARATUS FOR ESTIMATING LEVEL OF SIGNAL OUTPUT FROM PHOTO-DETECTION DEVICE AND METHOD THEREFOR

(71) Applicants: HYUNDAI MOTOR COMPANY, Seoul (KR); Kia Corporation, Seoul (KR)

(72) Inventors: Eun Sang Lee, Seongnam-si (KR); Yong Sung Lee, Seongnam-si (KR); Sang Gyu Park, Suwon-si (KR); Woo Il Lee, Uiwang-si (KR)

(73) Assignees: HYUNDAI MOTOR COMPANY, Seoul (KR); Kia Corporation, Seoul (KR)

( * ) Notice: Subject to any disclaimer, the term of this patent is extended or adjusted under 35 U.S.C. 154(b) by 1024 days.

(21) Appl. No.: 17/679,590

(22) Filed: Feb. 24, 2022

(65) Prior Publication Data

US 2022/0268903 A1    Aug. 25, 2022

(30) Foreign Application Priority Data

Feb. 25, 2021    (KR) ........................ 10-2021-0026000

(51) Int. Cl.
G01S 7/487    (2006.01)
G01S 7/4861    (2020.01)
(52) U.S. Cl.
CPC .......... *G01S 7/4873* (2013.01); *G01S 7/4861* (2013.01)
(58) Field of Classification Search
None
See application file for complete search history.

(56) References Cited

U.S. PATENT DOCUMENTS 10,436,882 B2    10/2019  Meng et al.
11,131,756 B2     9/2021  Slobodyanyuk et al.
(Continued)

FOREIGN PATENT DOCUMENTS

JP        2013-096905 A     5/2013
KR    10-2016-0133878 A    11/2016
(Continued)

OTHER PUBLICATIONS

Elisabeta Nocerino, Candidate, "The Semiconductor Multiplication System for Photoelectrons in a Vacuum Silicon Photomultiplier Tube and Related Front End Electronics", Universita degli Studi di Napoli "Federico II", Facolta di Scienze Matematiche, Fisiche e Naturali, 2015/2016.
(Continued)

*Primary Examiner* — Eric L Bolda
(74) *Attorney, Agent, or Firm* — MORGAN, LEWIS & BOCKIUS LLP

(57) ABSTRACT

An apparatus for estimating a level of a signal output from a photo-detection device and a method therefor are provided. The apparatus includes a photo-detection device that outputs an electrical signal corresponding to an optical signal, a comparison device that outputs a high signal, when the electrical signal is greater than a threshold voltage, and outputs a low signal, when the electrical signal is not greater than the threshold voltage, and a controller that sets the threshold voltage, estimates a level of the electrical signal based on an output signal of the comparison device, and varies the threshold voltage based on the output signal of the comparison device, thus estimating the level of the electrical signal to have higher accuracy without having an ADC.

20 Claims, 11 Drawing Sheets

(56) References Cited

U.S. PATENT DOCUMENTS

| | | |
|---|---|---|
| 11,255,968 B2 | 2/2022 | Lee |
| 11,415,682 B1* | 8/2022 | Clark .................... G01S 7/4861 |
| 2017/0090019 A1 | 3/2017 | Slobodyanyuk et al. |
| 2018/0259625 A1* | 9/2018 | Gnecchi ................ G01S 7/4873 |
| 2019/0101648 A1 | 4/2019 | Lee |

FOREIGN PATENT DOCUMENTS

| | | |
|---|---|---|
| KR | 10-2018-0063211 A | 6/2018 |
| KR | 10-2018-0068046 A | 6/2018 |
| KR | 10-2019-0037884 A | 4/2019 |

OTHER PUBLICATIONS

Office Action issued in corresponding Korean Patent Application No. 10-2021-0026000 issued Mar. 20, 2023, with English translation.

* cited by examiner

APPARATUS FOR ESTIMATING LEVEL OF SIGNAL OUTPUT FROM PHOTO-DETECTION DEVICE AND METHOD THEREFOR

CROSS-REFERENCE TO RELATED APPLICATION

This application claims the benefit of priority to Korean Patent Application No. 10-2021-0026000, filed in the Korean Intellectual Property Office on Feb. 25, 2021, the entire contents of which are incorporated herein by reference.

TECHNICAL FIELD

The present disclosure relates to technologies of estimating a level (voltage) of an electrical signal output from a photo-detection device (or an optical signal received in the photo-detection device), without having an analog to digital converter (ADC) in a light detection and ranging (LiDAR) system.

BACKGROUND

In general, a LiDAR system emits a laser pulse, calculates a separation distance based on a time when the emitted laser pulse is reflected and returned from a target, and represents three-dimensional (3D) image information in the form of a point cloud based on the calculated separation distance.

Because such a point cloud is used for an autonomous vehicle to recognize a surrounding situation, it should be able to accurately represent the 3D image information and should include level (intensity) information of a signal reflected and returned from the target to distinguish different targets located in the same distance. For reference, although there are targets located in the same distance, a signal level varies with a reflectivity. Thus, the LiDAR system should have an ADC to identity a level of an electrical signal output from a photo-detection device which receives reflected light.

Because the LiDAR system provided in an autonomous driving should receive reflected light over a minimum of 16 channels and should have an ADC for each channel, there is an increase in the entire amount of power consumption. Particularly, because a silicon photomultiplier (SiPM) as a kind of photo-detection device has an excellent detection sensitivity and response characteristics to photons, but needs a sampling rate of a Giga sample per sec (GSPS) level due to a high-speed response characteristic, it should have a high-performance ADC which meets it. Such a high-performance ADC is expensive and acts as a factor of further increasing power consumption.

Details described in the background art above are written to increase the understanding of the background of the present disclosure, which may include details rather than an existing technology well known to those skilled in the art and should not be taken as an acknowledgment that this information forms any part of prior art.

SUMMARY

The present disclosure has been made to solve the above-mentioned problems occurring in the prior art while advantages achieved by the prior art are maintained intact.

An aspect of the present disclosure provides an apparatus for estimating a level of a signal output from a photo-detection device to have a comparison device for comparing a threshold voltage set by a controller with an electrical signal output from a photo-detection device, estimate a level (voltage) of the electrical signal using the threshold voltage set by the controller and an output signal of the comparison device, and vary the threshold voltage based on the output signal of the comparison device to estimate the level of the electrical signal to have higher accuracy without having an ADC and a method therefor.

The technical problems to be solved by the present disclosure are not limited to the aforementioned problems, and any other technical problems not mentioned herein will be clearly understood from the following description by those skilled in the art to which the present disclosure pertains. Furthermore, it may be easily seen that purposes and advantages of the present disclosure may be implemented by means indicated in claims and a combination thereof.

According to an aspect of the present disclosure, an apparatus for estimating a level of a signal output from a photo-detection device may include a photo-detection device that outputs an electrical signal corresponding to an optical signal, a comparison device that outputs a high signal, when the electrical signal is greater than a threshold voltage, and outputs a low signal, when the electrical signal is not greater than the threshold voltage, and a controller that sets the threshold voltage, estimates a level of the electrical signal based on an output signal of the comparison device, and varies the threshold voltage based on the output signal of the comparison device.

In an embodiment of the present disclosure, the controller may estimate a voltage of the electrical signal based on an output signal of the comparison device, the output signal corresponding to the varied threshold voltage.

In an embodiment of the present disclosure, the controller may increase the threshold voltage, when the output signal of the controller is the high signal, and may decrease the threshold voltage, when the output signal of the comparison device is the low signal.

In an embodiment of the present disclosure, the controller may increase or decrease the threshold voltage a predetermined number of times based on the output signal of the comparison device.

In an embodiment of the present disclosure, the controller may vary the threshold voltage, such that the more the number of times the threshold voltage is varied increases, the more the variable quantity of the threshold voltage decreases.

In an embodiment of the present disclosure, the controller may set a value obtained by adding a margin to the estimated voltage of the electrical signal to a final threshold voltage, may determine the final threshold voltage as a voltage of the electrical signal, when an output of the comparison device which receives the final threshold voltage and the electrical signal is the high signal, and may determine the estimated voltage of the electrical signal as a final voltage, when the output of the comparison device is the low signal.

In an embodiment of the present disclosure, the controller may set a value higher than resolution in estimating the voltage of the electrical signal by one stage to the margin.

In an embodiment of the present disclosure, the controller may determine a value obtained by subtracting a margin from the estimated voltage of the electrical signal as a voltage of the electrical signal.

In an embodiment of the present disclosure, the controller may determine that the photo-detection device does not output the electrical signal, when the comparison device never outputs the high signal in estimating the voltage of the electrical signal.

In an embodiment of the present disclosure, the photo-detection device may receive an optical signal reflected and returned from a target.

In an embodiment of the present disclosure, the photo-detection device may receive light from headlights of a vehicle or sunlight.

According to another aspect of the present disclosure, a method for estimating a level of a signal output from a photo-detection device may include outputting, by a photo-detection device, an electrical signal corresponding to an optical signal, outputting, by a comparison device, a high signal, when the electrical signal is greater than a threshold voltage, and outputting, by the comparison device, a low signal, when the electrical signal is not greater than the threshold voltage, and varying, by a controller, the threshold voltage based on an output signal of the comparison device, and estimating, by the controller, a voltage of the electrical signal based on an output signal of the comparison device, the output signal corresponding to the varied threshold voltage.

In an embodiment of the present disclosure, the varying of the threshold voltage may include increasing the threshold voltage, when the output signal of the comparison device is the high signal and decreasing the threshold voltage, when the output signal of the comparison device is the low signal.

In an embodiment of the present disclosure, the varying of the threshold voltage may include varying the threshold voltage, such that the more the number of times the threshold voltage is varied increases, the more the variable quantity of the threshold voltage decreases.

In an embodiment of the present disclosure, the method may further include setting a value obtained by adding a margin to the estimated voltage of the electrical signal to a final threshold voltage, determining the final threshold voltage as a voltage of the electrical signal, when an output of the comparison device which receives the final threshold voltage and the electrical signal is the high signal, and determining the estimated voltage of the electrical signal as a final voltage, when the output of the comparison device which receives the final threshold voltage and the electrical signal is the low signal.

In an embodiment of the present disclosure, the setting of the final threshold voltage may include setting a value higher than resolution in estimating the voltage of the electrical signal by one stage to the margin.

In an embodiment of the present disclosure, the method may further include determining a value obtained by subtracting a margin from the estimated voltage of the electrical signal as a voltage of the electrical signal.

In an embodiment of the present disclosure, the estimating of the voltage of the electrical signal may include determining that the photo-detection device does not output the electrical signal, when the comparison device never outputs the high signal in estimating the voltage of the electrical signal.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
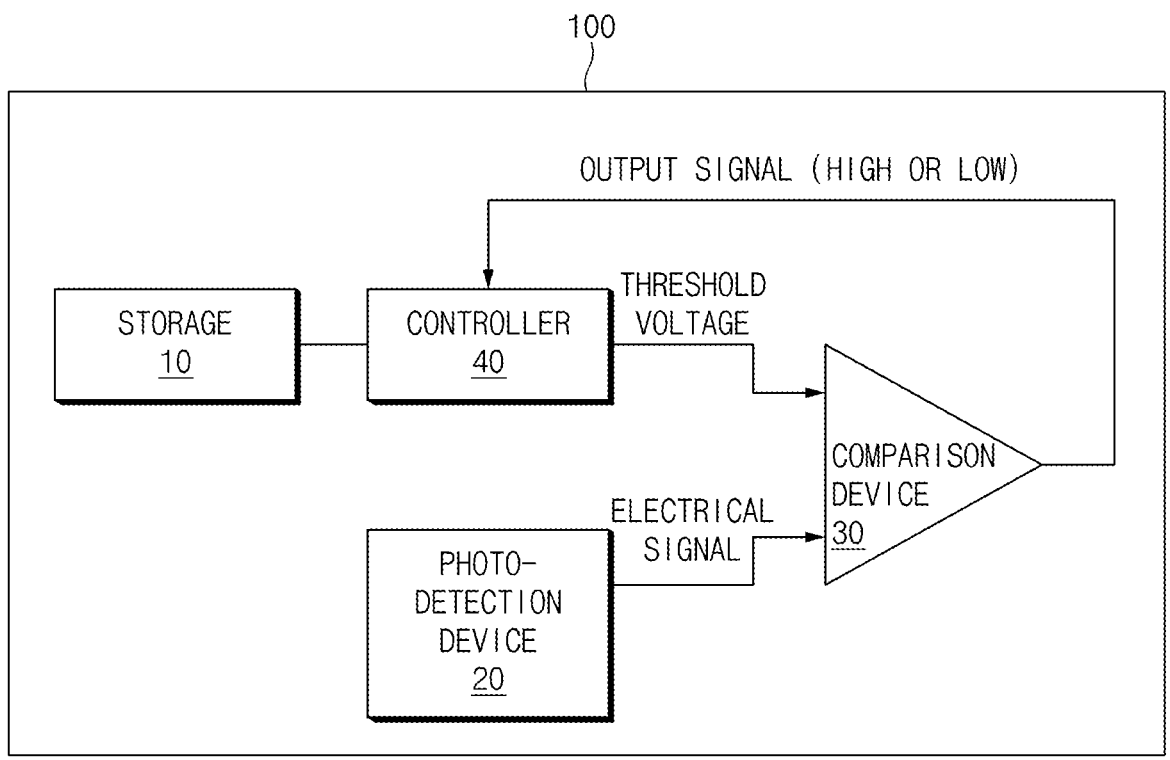
FIG. 1 is a block diagram illustrating a configuration of an apparatus for estimating a level of a signal output from a photo-detection device according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings.

Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating a configuration of an apparatus for estimating a level of a signal output from a photo-detection device according to an embodiment of the present disclosure.

As shown in FIG. 1, an apparatus 100 for estimating a level of a signal output from a photo-detection device according to an embodiment of the present disclosure may include a storage 10, a photo-detection device 20, a comparison device 30, and a controller 40. In this case, the respective components may be combined into one component and some components may be omitted, depending on a manner which executes the apparatus 100 for estimating the level of the signal output from the photo-detection device according to an embodiment of the present disclosure. For example, the comparison device 30 may be merged into the controller 40.

Seeing the respective components, first of all, the storage 10 may store various logics, algorithms, and programs required in a process of setting a threshold voltage of the comparison device 30, estimating a level (voltage) of an electrical signal output from the photo-detection device 20 based on an output signal of the comparison device 30, and varying the threshold voltage based on the output signal of the comparison device 30.

The storage 10 may store an initial threshold voltage (e.g., 1 V) set in the comparison device 30. In this case, the initial threshold voltage may be set by the controller 40 and may be randomly varied according to an intention of a designer.

The storage 10 may store a variable rate (e.g., 50%) of the threshold voltage. In this case, the variable rate may be applied on the basis of the initial threshold voltage for the initial threshold voltage, but may be applied on the basis of a variable quantity compared to a previous threshold voltage for a subsequent threshold voltage. For example, when the initial threshold voltage is 1 V and the variable rate is applied to the initial threshold voltage, a first threshold voltage is 0.5 V and a first variable quantity is 0.5 V. When the variable rate is applied to the first variable quantity, a second threshold voltage is 0.75 (0.5+0.25) V and a second variable quantity is 0.25 V. When the variable rate is applied to the second variable quantity, a third threshold voltage is 0.875 (0.75+0.125) V and a third variable quantity is 0.125 V.

The storage 10 may store threshold voltage values varied by the controller 40, in the process of estimating the level of the signal output from the photo-detection device 20.

The storage 10 according to an exemplary embodiment of the present disclosure may be a processor (e.g., computer, microprocessor, CPU, ASIC, circuitry, logic circuits, etc.). The processor may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, and an optical disk. Herein, the storage medium and the processor may be implemented as separate semiconductor circuits. Alternatively, the storage medium and the processor may be implemented as a single integrated semiconductor circuit. The processor may embody one or more processor(s).

The photo-detection device 20 according to an exemplary embodiment of the present disclosure may be a processor (e.g., computer, microprocessor, CPU, ASIC, circuitry, logic circuits, etc.). The photo-detection device 20 may have an associated non-transitory memory storing software instructions, e.g., a program(s), software instructions reproducing algorithms, etc., which, when executed by the processor of the photo-detection device 20, may be an element for playing a role in detecting an optical signal and converting the detected optical signal into an electrical signal, which may include a diode-type photodetection element, a photoconductor-type photodetection element, or the like classified according to a type of an element which detects an optical signal or a type of the detected optical signal. Herein, light is a kind of electromagnetic wave, which is collectively referred to as a visible ray, the wavelength of which is detected by eyes of person, and ultraviolet rays and infrared rays, which are not detected by eyes of person. Such a photo-detection device 20 may include an avalanche photodiode (APD) or a silicon photomultiplier (SiPM). Herein, the memory and the processor may be implemented as separate semiconductor circuits. Alternatively, the memory and the processor may be implemented as a single integrated semiconductor circuit. The processor may embody one or more processor(s).

The photo-detection device 20 may have an amplifier for amplifying the electrical signal. The amplifier may amplify the electrical signal and may input the amplified electrical signal to the comparison device 30.

The photo-detection device 20 may be used in a high beam assist system which automatically turns on a high beam in a driving environment where there is no street lamp and turning off the high beam not to obstruct the view of a driver of a vehicle on an opposite line. Thus, an embodiment of the present disclosure may be applied to the high beam assist system to estimate the amount of light from a headlight provided in a vehicle facing a host vehicle without an ADC.

The photo-detection device 20 may be used in an auto light system which automatically turns on a lamp (e.g., taillights or headlights) of the vehicle, when the day goes dark or when the vehicle enters a dark place such as a tunnel, and may turn off the lamp of the vehicle, when the vehicle departs from the tunnel. Thus, an embodiment of the present disclosure may be applied to the auto light system to estimate brightness (the amount of light) around the vehicle without an ADC.

The comparison device 30 according to an exemplary embodiment of the present disclosure may be a processor (e.g., computer, microprocessor, CPU, ASIC, circuitry, logic circuits, etc.). The comparison device 30 may have an associated non-transitory memory storing software instructions, e.g., a program(s), software instructions reproducing algorithms, etc., which, when executed by the processor of the comparison device 30, may compare the threshold voltage set by the controller 40 with the electrical signal (or a voltage of the electrical signal) output from the photo-detection device 20, may output a high signal, when the electrical signal is greater than the threshold voltage, and may output a low signal, when the electrical signal is not greater than the threshold voltage. Herein, the memory and the processor may be implemented as separate semiconductor circuits. Alternatively, the memory and the processor may be implemented as a single integrated semiconductor circuit. The processor may embody one or more processor(s).

The comparison device 30 may compare the threshold voltage set by the controller 40 with the electrical signal amplified by the amplifier, may output the high signal, when the electrical signal is greater than the threshold voltage, and may output the low signal, when the electrical signal is not greater than the threshold voltage.

The controller 40 may be implemented in the form of hardware, may be implemented in the form of software, or may be implemented in the form of a combination thereof. Preferably, the controller 40 according to an exemplary embodiment of the present disclosure may be a processor (e.g., computer, microprocessor, CPU, ASIC, circuitry, logic circuits, etc.). The processor may be implemented by a non-transitory memory storing, e.g., a program(s), software instructions reproducing algorithms, etc., which, when executed, may perform the overall control such that respective components may normally perform their own functions, and a processor configured to execute the program(s), software instructions reproducing algorithms, etc. Herein, the memory and the processor may be implemented as separate semiconductor circuits. Alternatively, the memory and the processor may be implemented as a single integrated semiconductor circuit. The processor may embody one or more processor(s).

Particularly, the controller 40 may perform a variety of control in a process of setting a threshold voltage of the comparison device 30, estimating a level (voltage) of the electrical signal output from the photo-detection device 20 based on an output signal of the comparison device 30, and varying the threshold voltage based on the output signal of the comparison device 30.

Hereinafter, a description will be given in detail of a process of estimating a voltage of an electrical signal output from the photo-detection device 20 in the controller 40 with reference to FIGS. 2A to 2G.

Figure 2A:
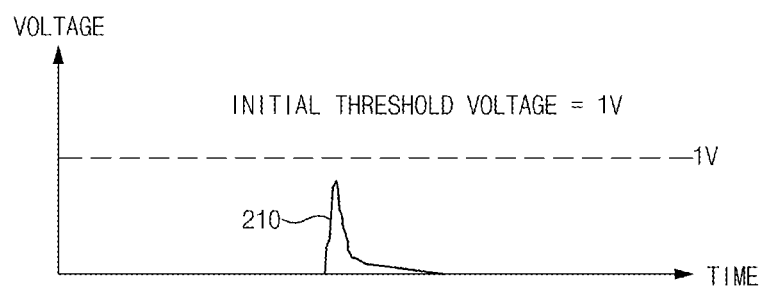
FIG. 2A is a drawing illustrating a process of estimating a level of a signal output from a photo-detection device based on an initial threshold voltage in a controller provided in an apparatus for estimating a level of a signal output from the photo-detection device according to an embodiment of the present disclosure.

FIG. 2A is a drawing illustrating a process of estimating a level of a signal output from a photo-detection device based on an initial threshold voltage in a controller provided in an apparatus for estimating a level of a signal output from the photo-detection device according to an embodiment of the present disclosure.

Figure 2B:
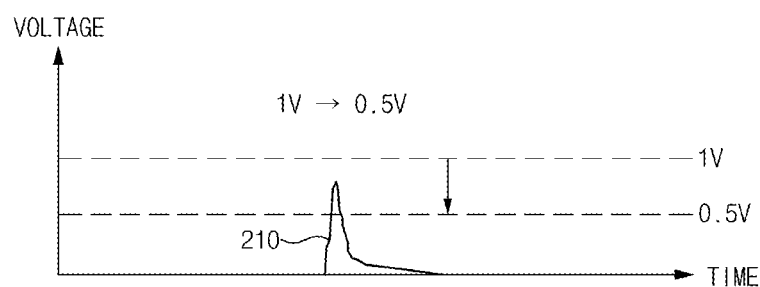
FIG. 2B is a drawing illustrating a process of estimating a level of a signal output from a photo-detection device based on a first threshold voltage in a controller provided in an apparatus for estimating a level of a signal output from the photo-detection device according to an embodiment of the present disclosure.

As shown in FIG. 2A, the vertical axis indicates voltage, the horizontal axis indicates time, and the initial threshold voltage is, for example, 1 V. In this case, as an electrical signal 210 output from a photo-detection device 20 of FIG. 1 is not greater than an initial threshold voltage, a comparison device 30 of FIG. 1 may output a low signal. Thus, because the output signal of the comparison device 30 is low in the state where the initial threshold voltage is set in the comparison device 30, a controller 40 of FIG. 1 may determine that the voltage of the electrical signal 210 is less than or equal to the initial threshold voltage. Thus, the controller 40 may apply a variable rate (e.g., 50%) to the initial threshold voltage. Because the output signal of the comparison device 30 is low, as shown in FIG. 2B, the controller 40 may apply the variable rate in a direction where the initial threshold voltage decreases. At this time, when the output signal of the comparison device 30 is high, the controller 40 may apply the variable rate in a direction where the initial threshold voltage increases.

FIG. 2B is a drawing illustrating a process of estimating a level of a signal output from a photo-detection device based on a first threshold voltage in a controller provided in an apparatus for estimating a level of a signal output from the photo-detection device according to an embodiment of the present disclosure.

Figure 2C:
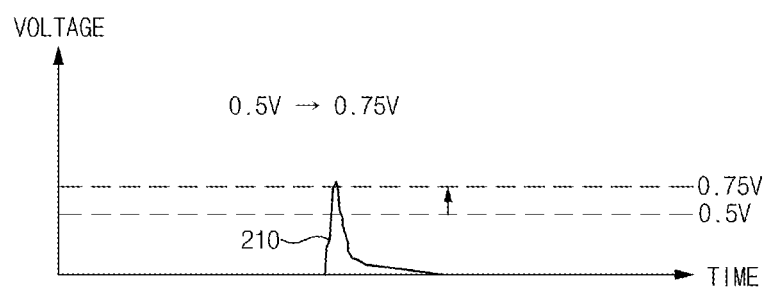
FIG. 2C is a drawing illustrating a process of estimating a level of a signal output from a photo-detection device based on a second threshold voltage in a controller provided in an apparatus for estimating a level of a signal output from the photo-detection device according to an embodiment of the present disclosure.

As shown in FIG. 2B, the vertical axis indicates voltage and the horizontal axis indicates time. A controller 40 of FIG. 1 may apply a variable rate (e.g., 50%) to an initial threshold voltage of 1 V to set a first threshold voltage to 0.5 V (=1V−1V×0.5). In other words, the controller 40 may decrease the initial threshold voltage by 0.5 V. In this case, as an electrical signal 210 output from a photo-detection device 20 of FIG. 1 is greater than the first threshold voltage, a comparison device 30 of FIG. 1 may output a high signal. Thus, because the output signal of the comparison device 30 is high in the state where the first threshold voltage is set in the comparison device 30, the controller 40 may determine that the voltage of the electrical signal 210 is greater than the first threshold voltage. Thus, the controller 40 may apply the variable rate (e.g., 50%) to the first threshold voltage. Because the output signal of the comparison device 30 is high, as shown in FIG. 2C, the controller 40 may apply the variable rate in a direction where the first threshold voltage of 0.5 V increases. At this time, when the output signal of the comparison device 30 is low, the controller 40 may apply the variable rate in a direction where the first threshold voltage decreases.

FIG. 2C is a drawing illustrating a process of estimating a level of a signal output from a photo-detection device based on a second threshold voltage in a controller provided in an apparatus for estimating a level of a signal output from the photo-detection device according to an embodiment of the present disclosure.

Figure 2D:
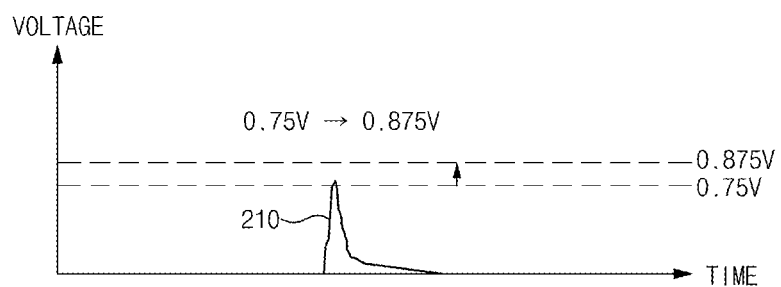
FIG. 2D is a drawing illustrating a process of estimating a level of a signal output from a photo-detection device based on a third threshold voltage in a controller provided in an apparatus for estimating a level of a signal output from the photo-detection device according to an embodiment of the present disclosure.

As shown in FIG. 2C, the vertical axis indicates voltage and the horizontal axis indicates time. A controller 40 of FIG. 1 may apply a variable rate (e.g., 50%) to a first threshold voltage of 0.5 V to set a second threshold voltage to 0.75 V (=0.5 V+0.5 V×0.5). In other words, the controller 40 may increase the first threshold voltage by 0.25 V. In this case, as an electrical signal 210 output from a photo-detection device 20 of FIG. 1 is greater than the second threshold voltage, a comparison device 30 of FIG. 1 may output a high signal. Thus, because the output signal of the comparison device 30 is high in the state where the second threshold voltage is set in the comparison device 30, the controller 40 may determine that the voltage of the electrical signal 210 is greater than the second threshold voltage. Thus, the controller 40 may apply the variable rate (e.g., 50%) to the first threshold voltage. Because the output signal of the comparison device 30 is high, as shown in FIG. 2D, the controller 40 may apply the variable rate in a direction where the second threshold voltage of 0.75 V increases. At this time, when the output signal of the comparison device 30 is low, the controller 40 may apply the variable rate in a direction where the second threshold voltage decreases.

FIG. 2D is a drawing illustrating a process of estimating a level of a signal output from a photo-detection device based on a third threshold voltage in a controller provided in an apparatus for estimating a level of a signal output from the photo-detection device according to an embodiment of the present disclosure.

Figure 2E:
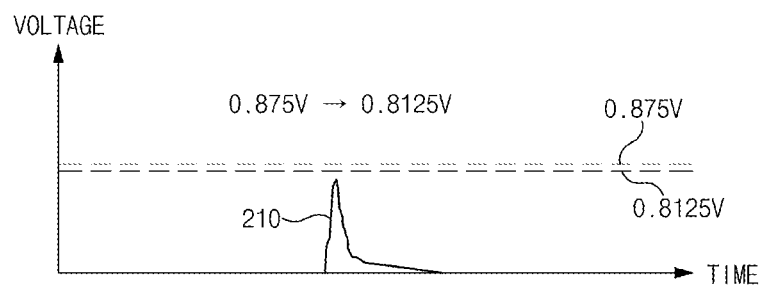
FIG. 2E is a drawing illustrating a process of estimating a level of a signal output from a photo-detection device based on a fourth threshold voltage in a controller provided in an apparatus for estimating a level of a signal output from the photo-detection device according to an embodiment of the present disclosure.

As shown in FIG. 2D, the vertical axis indicates voltage and the horizontal axis indicates time. A controller 40 of FIG. 1 may apply a variable rate (e.g., 50%) to a second threshold voltage of 0.75 V to set a third threshold voltage to 0.875 V (=0.75 V+0.25 V×0.5). In other words, the controller 40 may increase the second threshold voltage by 0.125 V. In this case, as an electrical signal 210 output from a photo-detection device 20 of FIG. 1 is not greater than the third threshold voltage, a comparison device 30 of FIG. 1 may output a low signal. Thus, because the output signal of the comparison device 30 is low in the state where the third threshold voltage is set in the comparison device 30, the controller 40 may determine that the voltage of the electrical signal 210 is not greater than the third threshold voltage. Thus, the controller 40 may apply the variable rate (e.g., 50%) to the third threshold voltage. Because the output signal of the comparison device 30 is low, as shown in FIG. 2E, the controller 40 may apply the variable rate in a direction where the third threshold voltage of 0.875 V decreases. At this time, when the output signal of the comparison device 30 is high, the controller 40 may apply the variable rate in a direction where the third threshold voltage increases.

FIG. 2E is a drawing illustrating a process of estimating a level of a signal output from a photo-detection device based on a fourth threshold voltage in a controller provided in an apparatus for estimating a level of a signal output from the photo-detection device according to an embodiment of the present disclosure.

Figure 2F:
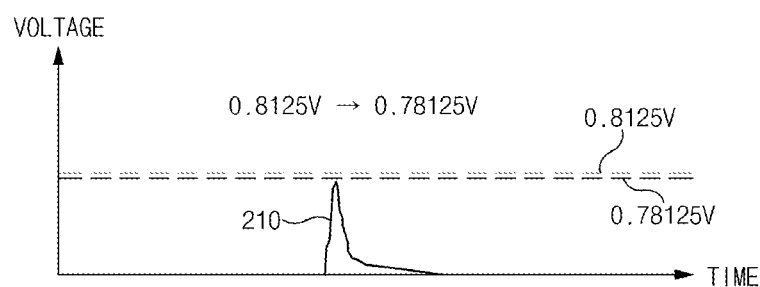
FIG. 2F is a drawing illustrating a process of estimating a level of a signal output from a photo-detection device based on a fifth threshold voltage in a controller provided in an apparatus for estimating a level of a signal output from the photo-detection device according to an embodiment of the present disclosure.

As shown in FIG. 2E, the vertical axis indicates voltage and the horizontal axis indicates time. A controller 40 of FIG. 1 may apply a variable rate (e.g., 50%) to a third threshold voltage of 0.875 V to set a fourth threshold voltage to 0.8125 V (=0.875 V−0.125 V×0.5). In other words, the controller 40 may decrease the third threshold voltage by 0.0625 V. In this case, as an electrical signal 210 output from a photo-detection device 20 of FIG. 1 is not greater than the fourth threshold voltage, a comparison device 30 of FIG. 1 may output a low signal. Thus, because the output signal of the comparison device 30 is low in the state where the fourth threshold voltage is set in the comparison device 30, the controller 40 may determine that the voltage of the electrical signal 210 is not greater than the fourth threshold voltage. Thus, the controller 40 may apply the variable rate (e.g., 50%) to the fourth threshold voltage. Because the output signal of the comparison device 30 is low, as shown in FIG. 2F, the controller 40 may apply the variable rate in a direction where the fourth threshold voltage of 0.8125 V decreases. At this time, when the output signal of the comparison device 30 is low, the controller 40 may apply the variable rate in a direction where the fourth threshold voltage decreases.

FIG. 2F is a drawing illustrating a process of estimating a level of a signal output from a photo-detection device based on a fifth threshold voltage in a controller provided in an apparatus for estimating a level of a signal output from the photo-detection device according to an embodiment of the present disclosure.

Figure 2G:
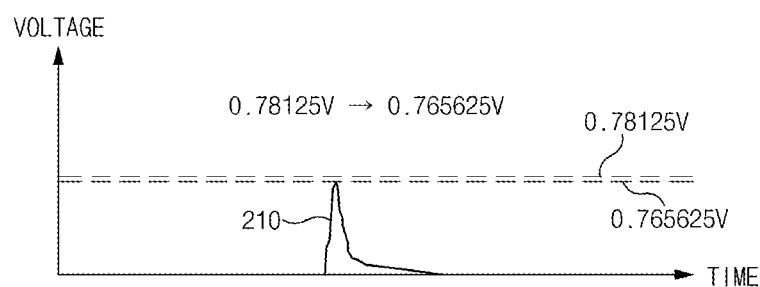
FIG. 2G is a drawing illustrating a process of estimating a level of a signal output from a photo-detection device based on a sixth threshold voltage in a controller provided in an apparatus for estimating a level of a signal output from the photo-detection device according to an embodiment of the present disclosure.

As shown in FIG. 2F, the vertical axis indicates voltage and the horizontal axis indicates time. A controller 40 of FIG. 1 may apply a variable rate (e.g., 50%) to a fourth threshold voltage of 0.8125 V to set a fifth threshold voltage to 0.78125 V (=0.8125V−0.0625V×0.5). In other words, the controller 40 may decrease the fourth threshold voltage by 0.03125 V. In this case, as an electrical signal 210 output from a photo-detection device 20 of FIG. 1 is not greater than the fifth threshold voltage, a comparison device 30 of FIG. 1 may output a low signal. Thus, because the output signal of the comparison device 30 is low in the state where the fifth threshold voltage is set in the comparison device 30, the controller 40 may determine that the voltage of the electrical signal 210 is not greater than the fifth threshold voltage. Thus, the controller may apply the variable rate (e.g., 50%) to the fifth threshold voltage. Because the output signal of the comparison device 30 is low, as shown in FIG. 2G, the controller 40 may apply the variable rate in a direction where the fifth threshold voltage of 0.78125 V decreases. At this time, when the output signal of the comparison device 30 is high, the controller 40 may apply the variable rate in a direction where the fifth threshold voltage increases.

FIG. 2G is a drawing illustrating a process of estimating a level of a signal output from a photo-detection device based on a sixth threshold voltage in a controller provided in an apparatus for estimating a level of a signal output from the photo-detection device according to an embodiment of the present disclosure.

As shown in FIG. 2G, the vertical axis indicates voltage and the horizontal axis indicates time. A controller 40 of FIG. 1 may apply a variable rate (e.g., 50%) to a fifth threshold voltage of 0.78125V to set a sixth threshold voltage to 0.765625 V (=0.78125 V−0.03125 V×0.5). In other words, the controller 40 may decrease the fifth threshold voltage by 0.015625 V. In this case, as an electrical signal 210 output from a photo-detection device 20 of FIG. 1 is greater than the sixth threshold voltage, a comparison device 30 of FIG. 1 may output a high signal. Thus, because the output signal of the comparison device 30 is high in the state where the sixth threshold voltage is set in the comparison device 30, the controller 40 may determine that the voltage of the electrical signal 210 is greater than the sixth threshold voltage. As a result, the controller 40 may estimate the sixth threshold voltage of 0.765625 V as the voltage of the electrical signal 210 output from the photo-detection device 20.

As described above, the example of applying the variable rate six times in an embodiment of the present disclosure. This refers to having a resolution of 0.015625V ($2^{-6}$). Such resolution may be changed according to an intention of a designer.

Hereinafter, a description will be given in detail of a process of determining a voltage of an electrical signal output from the photo-detection device 20 in the controller 40 with reference to FIG. 3.

Figure 3:
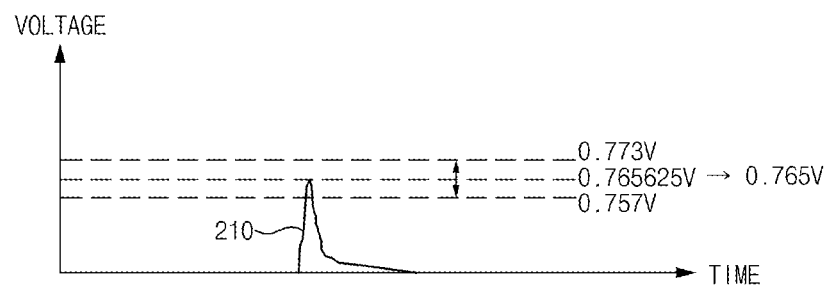
FIG. 3 is a drawing illustrating a process of determining a level of a signal output from a photo-detection device in a controller provided in an apparatus for estimating a level of a signal output from the photo-detection device according to an embodiment of the present disclosure.

FIG. 3 is a drawing illustrating a process of determining a level of a signal output from a photo-detection device in a controller provided in an apparatus for estimating a level of a signal output from the photo-detection device according to an embodiment of the present disclosure, which illustrates a process of determining a level of a signal output from the photo-detection device based on the result described with reference to FIGS. 2A to 2G.

First of all, a controller 40 of FIG. 1 may obtain a margin ($2^{-7}$=0.0078125). At this time, the margin may be set to be higher than resolution ($2^{-6}$) in an estimation process by one stage.

As a comparison device 30 of FIG. 1 detects an electrical signal 210 output from a photo-detection device 20 of FIG. 1 based on a sixth threshold voltage of 0.765625 V (outputs a high signal) in FIG. 2G, the controller 40 may set a result obtained by adding the margin to the sixth threshold voltage to a seventh threshold voltage of the comparison device 30. At this time, when the comparison device 30 detects the electrical signal 210 output from the photo-detection device 20 based on the seventh threshold voltage, the controller 40 may determine the seventh voltage as a voltage of the electrical signal 210 output from the photo-detection device 20. When the comparison device 30 does not detect the electrical signal 210 output from the photo-detection device 20 based on the seventh threshold voltage, the controller 40 may determine the sixth threshold voltage as a voltage of the electrical signal 210 output from the photo-detection device 20.

When the comparison device 30 does not detect the electrical signal 210 output from the photo-detection device 20 based on the sixth threshold voltage of 0.765625 V (outputs a low signal) in FIG. 2G, the controller 40 may set a result obtained by subtracting the margin from the sixth threshold voltage to the seventh threshold voltage of the comparison device 30. At this time, the controller 40 may determine the seventh threshold voltage as a voltage of the electrical signal 210 output from the photo-detection device 20. Herein, when outputting the high signal even just once in the process of estimating the level of the signal, shown in FIGS. 2A to 2G, the comparison device 30 may detect the electrical signal 210 output from the photo-detection device 20 based on the seventh threshold voltage. Thus, when the comparison device 30 never outputs the high signal in the process of estimating the level of the signal, shown in FIGS. 2A to 2G, the controller 40 may determine that there is no electrical signal output from the photo-detection device 20 and may fail to perform the process of determining the level of the signal output from the photo-detection device 20.

Meanwhile, the controller 40 may have a digital to analog converter (DAC) for inputting a threshold voltage to the comparison device 30.

Figure 4:
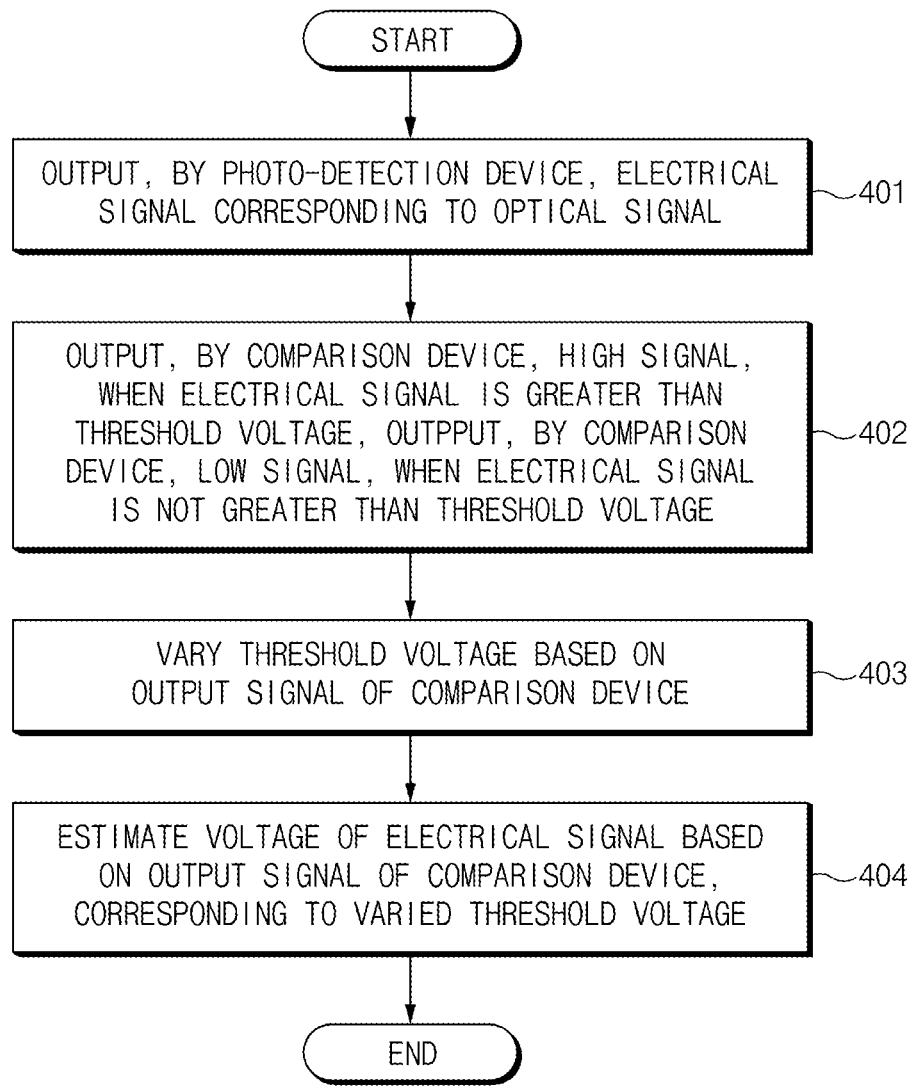
FIG. 4 is a flowchart illustrating a method for estimating a level of a signal output from a photo-detection device according to an embodiment of the present disclosure.

FIG. 4 is a flowchart illustrating a method for estimating a level of a signal output from a photo-detection device according to an embodiment of the present disclosure.

First of all, in operation 401, a photo-detection device 20 of FIG. 1 may output an electrical signal corresponding to an optical signal.

In operation 402, a comparison device 30 of FIG. 1 may output a high signal, when the electrical signal is greater than a threshold voltage, and may output a low signal, when the electrical signal is not greater than the threshold voltage.

In operation 403, a controller 40 of FIG. 1 may vary the threshold voltage based on an output signal of the comparison device 30.

In operation 404, the controller 40 may estimate a voltage of the electrical signal based on the output signal of the comparison device 30, corresponding to the varied threshold voltage.

Herein, operations 403 and 404 may be repeatedly performed according to predetermined resolution (the number of times the threshold voltage is varied).

Figure 5:
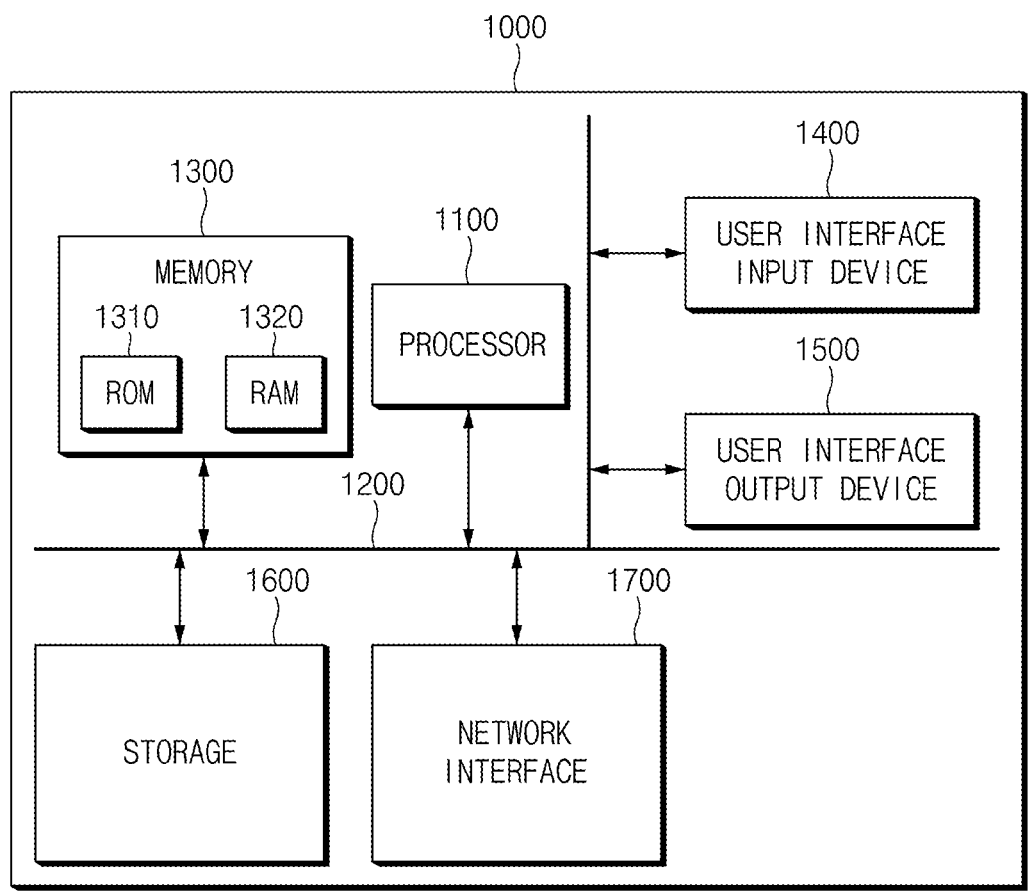
FIG. 5 is a block diagram illustrating a computing system for executing a method for estimating a level of a signal output from a photo-detection device according to an embodiment of the present disclosure.

FIG. 5 is a block diagram illustrating a computing system for executing a method for estimating a level of a signal output from a photo-detection device according to an embodiment of the present disclosure.

Referring to FIG. 5, the above-mentioned method for estimating a level of a signal output from a photo-detection device according to an embodiment of the present disclosure may be implemented by means of the computing system. A computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a SSD (Solid State Drive), a removable disk, and a CD-ROM. The exemplary storage medium may be coupled to the processor, and the processor may read information out of the storage medium and may record information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The apparatus for estimating the level of the signal output from the photo-detection device and the method therefor according to an embodiment of the present disclosure may be provided to have a comparison device for comparing a threshold voltage set by a controller with an electrical signal output from a photo-detection device, estimate a level (voltage) of the electrical signal using the threshold voltage set by the controller and an output signal of the comparison device, and vary the threshold voltage based on the output signal of the comparison device, thus estimating the level of the electrical signal to have higher accuracy without having an ADC.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. An apparatus for estimating a level of a signal output from a photo-detection device, the apparatus comprising:
the photo-detection device configured to output an electrical signal corresponding to an optical signal;
a comparison device configured to output a high signal, when the electrical signal is greater than a threshold voltage, and output a low signal, when the electrical signal is not greater than the threshold voltage; and
a controller configured to set the threshold voltage, estimate a level of the electrical signal based on an output signal of the comparison device, and vary the threshold voltage based on a comparison between the electrical signal and the threshold voltage set by the controller.

2. The apparatus of claim 1, wherein the controller estimates a voltage of the electrical signal based on the output signal of the comparison device, the output signal corresponding to the varied threshold voltage.

3. The apparatus of claim 2, wherein the controller increases the threshold voltage, when the output signal of the comparison device is the high signal, and decreases the threshold voltage, when the output signal of the comparison device is the low signal.

4. The apparatus of claim 3, wherein the controller increases or decreases the threshold voltage a predetermined number of times based on the output signal of the comparison device.

5. The apparatus of claim 1, wherein the controller varies the threshold voltage, such that the more the number of times the threshold voltage is varied increases, the more the variable quantity of the threshold voltage, which is applied a variable rate to the threshold voltage, decreases.

6. The apparatus of claim 2, wherein the controller sets a value obtained by adding a margin to the estimated voltage of the electrical signal to a final threshold voltage, determines the final threshold voltage as a voltage of the electrical signal, when an output of the comparison device which receives the final threshold voltage and the electrical signal is the high signal, and determines the estimated voltage of the electrical signal as a final voltage, when the output of the comparison device is the low signal.

7. The apparatus of claim 6, wherein the controller sets a margin greater than resolution by one stage when estimating the voltage of the electrical signal.

8. The apparatus of claim 2, wherein the controller determines a value obtained by subtracting a margin from the estimated voltage of the electrical signal as a voltage of the electrical signal.

9. The apparatus of claim 8, wherein the controller sets a margin greater than resolution by one stage when estimating the voltage of the electrical signal.

10. The apparatus of claim 2, wherein the controller determines that the photo-detection device does not output the electrical signal, when the comparison device never outputs the high signal in estimating the voltage of the electrical signal.

11. The apparatus of claim 1, wherein the photo-detection device receives an optical signal reflected and returned from a target.

12. The apparatus of claim 1, wherein the photo-detection device receives light from headlights of a vehicle or sunlight.

13. A method for estimating a level of a signal output from a photo-detection device, the method comprising:
outputting, by the photo-detection device, an electrical signal corresponding to an optical signal;
outputting, by a comparison device, a high signal, when the electrical signal is greater than a threshold voltage, and outputting, by the comparison device, a low signal, when the electrical signal is not greater than the threshold voltage;
varying, by a controller, the threshold voltage based on a comparison between the electrical signal and the threshold voltage set by the controller; and
estimating, by the controller, a voltage of the electrical signal based on an output signal of the comparison device, the output signal corresponding to the varied threshold voltage.

14. The method of claim 13, wherein the varying of the threshold voltage includes:
increasing the threshold voltage, when the output signal of the comparison device is the high signal; and
decreasing the threshold voltage, when the output signal of the comparison device is the low signal.

15. The method of claim 13, wherein the varying of the threshold voltage includes:
varying the threshold voltage, such that the more the number of times the threshold voltage is varied increases, the more the variable quantity of the threshold voltage, which is applied a variable rate to the threshold voltage, decreases.

16. The method of claim 13, further comprising:
setting a value obtained by adding a margin to the estimated voltage of the electrical signal to a final threshold voltage;
determining the final threshold voltage as a voltage of the electrical signal, when an output of the comparison device which receives the final threshold voltage and the electrical signal is the high signal; and
determining the estimated voltage of the electrical signal as a final voltage, when the output of the comparison device which receives the final threshold voltage and the electrical signal is the low signal.

17. The method of claim 16, wherein the setting of the final threshold voltage includes:
setting a margin greater than resolution by one stage when estimating the voltage of the electrical signal.

18. The method of claim 13, further comprising:
determining a value obtained by subtracting a margin from the estimated voltage of the electrical signal as a voltage of the electrical signal.

19. The method of claim 18, wherein the determining of the value as the voltage of the electrical signal includes:
setting a margin greater than resolution by one stage when estimating the voltage of the electrical signal.

20. The method of claim 13, wherein the estimating of the voltage of the electrical signal includes:
determining that the photo-detection device does not output the electrical signal, when the comparison device never outputs the high signal in estimating the voltage of the electrical signal.

* * * * *